United States Patent
Nakatani et al.

(10) Patent No.: US 8,064,306 B2
(45) Date of Patent: Nov. 22, 2011

(54) OPTICAL DISC DEVICE AND HYBRID OPTICAL DISC

(75) Inventors: Morio Nakatani, Ichinomiya (JP); Keiji Horiuchi, Higashiosaka (JP); Masahiro Nakata, Ogaki (JP)

(73) Assignee: Sanyo Electric Co., Ltd., Osaka (JP)

( * ) Notice: Subject to any disclaimer, the term of this patent is extended or adjusted under 35 U.S.C. 154(b) by 1213 days.

(21) Appl. No.: 11/476,142

(22) Filed: Jun. 28, 2006

(65) Prior Publication Data

US 2007/0025221 A1    Feb. 1, 2007

(30) Foreign Application Priority Data

Jun. 30, 2005  (JP) .................................. 2005-191941

(51) Int. Cl.
  *G11B 15/04*  (2006.01)
(52) U.S. Cl. ........................... 369/53.2; 369/94; 369/283
(58) Field of Classification Search ............... 369/53.45, 369/56.2, 59.25, 275.3, 47.16, 47.19, 47.23, 369/94, 275.1, 30.04; 720/18
  See application file for complete search history.

(56) References Cited

U.S. PATENT DOCUMENTS

| | | | | |
|---|---|---|---|---|
| 6,069,868 | A * | 5/2000 | Kashiwagi | 369/275.1 |
| 7,151,729 | B1 * | 12/2006 | Park et al. | 369/53.2 |
| 7,623,423 | B2 * | 11/2009 | Osabe et al. | 369/47.16 |
| 7,755,982 | B2 * | 7/2010 | Nakatani | 369/30.04 |
| 2005/0185560 | A1 * | 8/2005 | Kim et al. | 369/94 |
| 2005/0254787 | A1 | 11/2005 | Ando et al. | |
| 2006/0179448 | A1 * | 8/2006 | Smith et al. | 720/718 |

FOREIGN PATENT DOCUMENTS

| | | |
|---|---|---|
| JP | 11-296861 | 10/1999 |
| JP | 2003-346348 A | 12/2003 |
| JP | 2004-096282 | 3/2004 |
| JP | 2004-342173 | 12/2004 |
| JP | 2004-347760 | 12/2004 |
| JP | 2006-155830 | 6/2006 |
| WO | WO 2004/008747 A2 | 1/2004 |

OTHER PUBLICATIONS

Japanese Decision of Final Rejection, with English Translation, issued in Japanese Patent Application No. JP 2005-191941, dated Nov. 18, 2008.

Japanese Office Action, with English translation, issued in Japanese Patent Application No. JP 2005-191941, mailed Apr. 1, 2008.

Japanese Notification of Reasons for Refusal, w/ English translation thereof, issued in Japanese Patent Application No. JP 2008-316436 dated Apr. 13, 2010.

* cited by examiner

*Primary Examiner* — Paul Huber
(74) *Attorney, Agent, or Firm* — McDermott Will & Emery LLP

(57) ABSTRACT

When a hybrid optical disc is loaded on a player, the next generation DVD layer is reproduced in preference to the DVD layer. Jump to the DVD layer is appropriately performed based on the content of the reproduction list held in the next generation DVD. The jump to the DVD layer is performed based on the command information (jump command) held in the reproduction list of the next generation DVD layer. When reproduction of the title specified by the command information is finished after the jump to the DVD layer, the process returns to the HDDVD layer, and reproduction is performed from the position following the reproducing position at the time of the jump. Thus, the content of the HDDVD layer and the content of the DVD layer are reproduced as one stream.

10 Claims, 6 Drawing Sheets

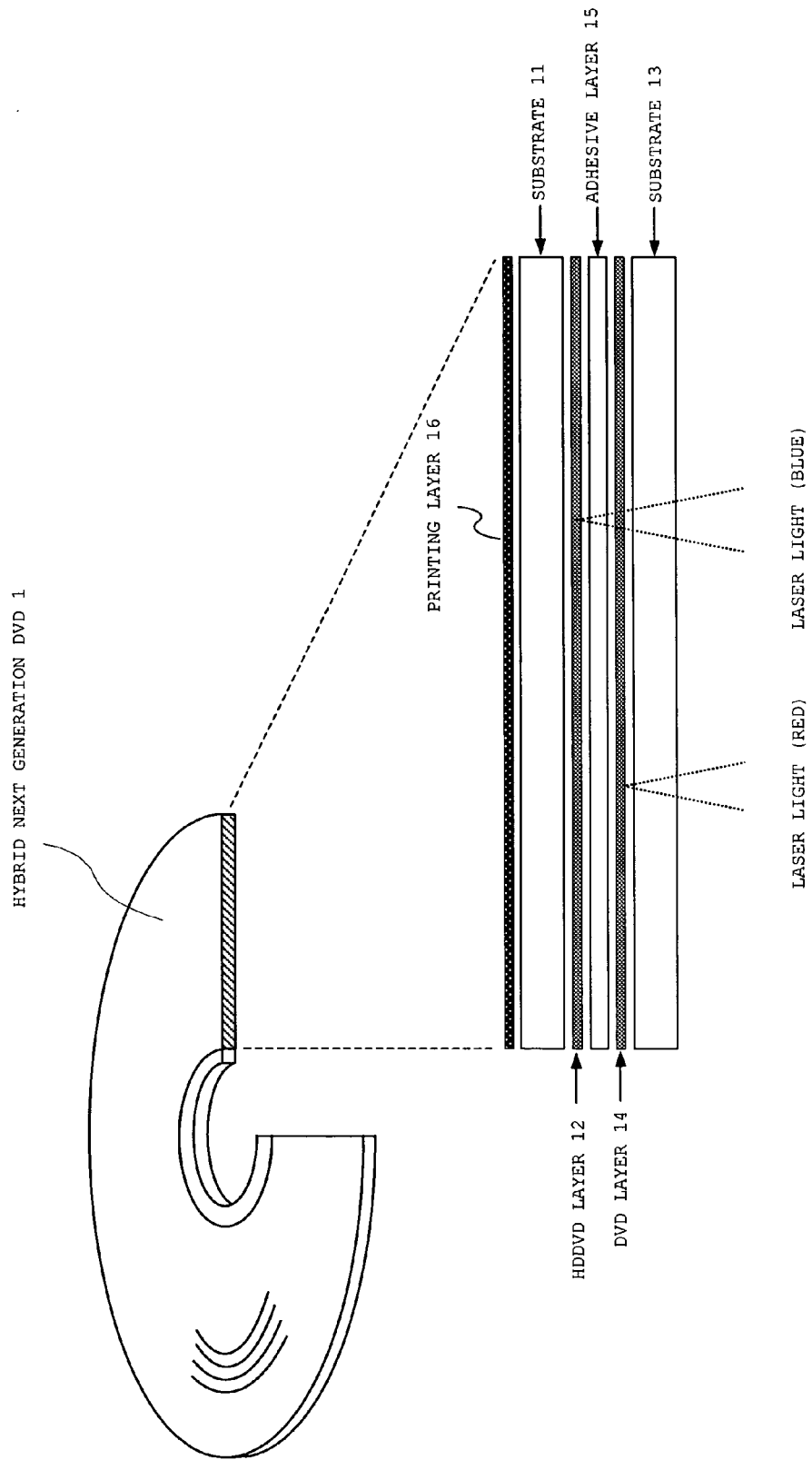

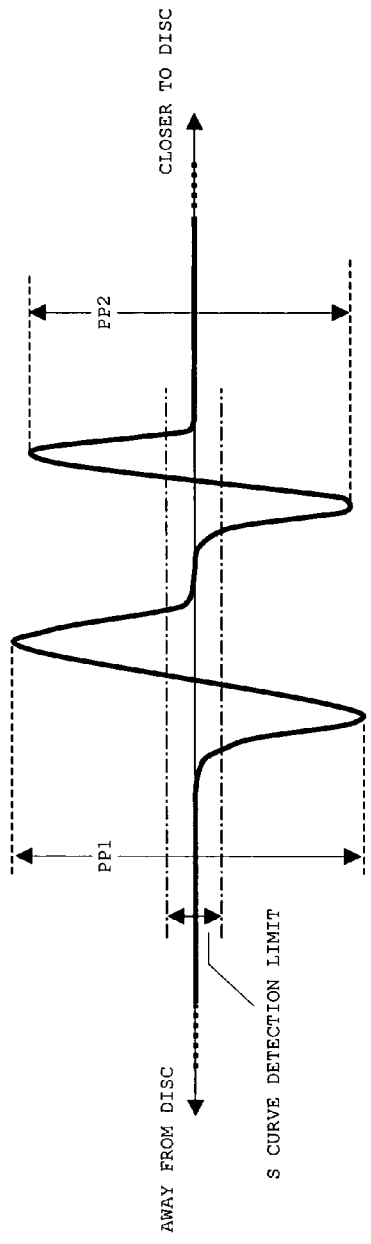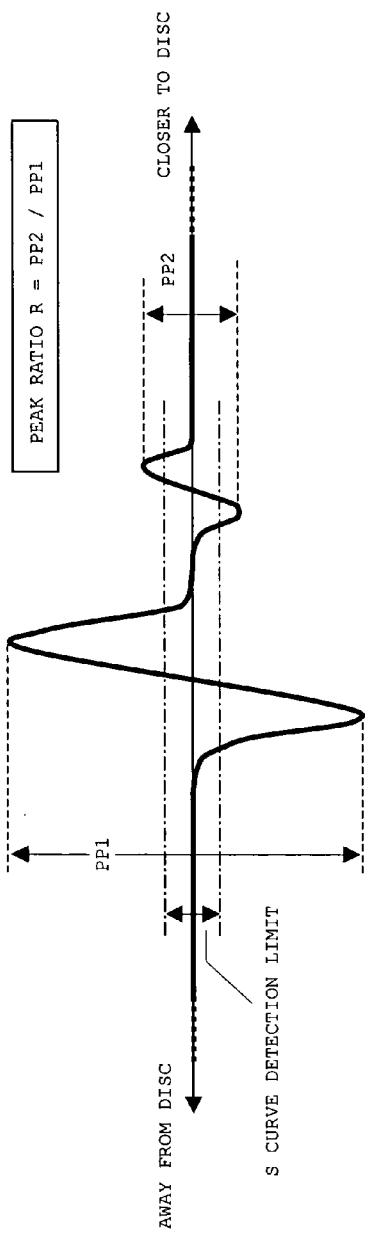
FIG. 2A CASE OF MULTI-LAYER DISC
FIG. 2B CASE OF HYBRID NEXT GENERATION DVD

OPTICAL DISC DEVICE AND HYBRID OPTICAL DISC

This application claims priority under 35 U.S.C. §119 of Japanese Patent Application No. 2005-191941 filed Jun. 30, 2005.

BACKGROUND OF THE INVENTION

1. Field of the Invention

The present invention relates to optical disc devices and hybrid optical discs, and, in particular, to a hybrid optical disc in which a DVD layer and a next generation DVD layer are arranged in sequence from a laser light entering side, and an optical disc device suitably used in reproducing the same.

2. Description of the Related Art

Presently, standardization of the next generation DVD (Digital Versatile Disc) using a blue laser light having a wavelength of about 405 nm is being put forward. In such standardization, consideration is made on arranging two recording layers, which are the recording layer corresponding to the blue laser light (hereinafter referred to as "HDDVD layer") and the recording layer corresponding to the red laser light (hereinafter referred to as "DVD layer"), in the stacking direction.

In the next generation DVD (hereinafter referred to as "hybrid next generation DVD"), the DVD layer is positioned first when seen from the laser light entering side. The same format as that for the existing DVD is applied to the DVD layer. The information indicating that the HDDVD layer additionally exists behind the DVD layer is not held in the DVD layer. Therefore, when drawing process is performed on the DVD layer, the disc is handled as a DVD with a single recording layer.

Japanese Laid-Open Patent Publication No. 2003-346348 discloses an optical disc having two recording layers and a driving device for the same.

The driving device is normally designed to perform the drawing process on the recording layer positioned first when seen from the optical pick up side. The reproduction process is performed on the relevant recording layer if the lead-in information can be read from the recording layer. When the hybrid next generation DVD is loaded on this type of driving device, reproduction on the DVD layer arranged on the optical pick up side is carried out. However, the information indicating that the HDDVD layer is present is not held in the DVD layer, as mentioned above. Thus, the reproduction process similar to that when the DVD of single layer type is loaded is performed on the driving device side. In this case, the reproduction of the HDDVD layer may be missed although the HDDVD layer that may provide high capacity content is present.

SUMMARY OF THE INVENTION

The present invention aims to provide an optical disc device that avoids the above problems and that smoothly and effectively reproduces the HDDVD layer and the DVD layer, and a hybrid optical disc.

A first aspect of the present invention relates to an optical disc device capable of reproducing a hybrid optical disc in which a DVD layer and a next generation DVD layer are arranged in sequence from a laser light entering side. The optical disc device includes: a disc determining means for determining that the hybrid optical disc is loaded; a reproducing means for executing a reproduction process on the next generation DVD layer in preference to the DVD layer when it is determined that the hybrid optical disc is loaded; a jump determining means for determining the necessity of a jump to the DVD layer; and a jump controlling means for executing the jump from the next generation DVD layer to the DVD layer according to the determination result by the jump determining means.

In the first aspect, the jump determining means is configured to determine the necessity of the jump to the DVD layer based on command information acquired by reproducing the next generation DVD layer.

In the first aspect, the jump controlling means is configured to determine a jumping position with respect to the DVD layer based on the command information acquired by reproducing the next generation DVD layer.

In the first aspect, the jump controlling means is configured to hold a reproducing position of the next generation DVD layer immediately before the jump to the DVD layer, and execute the jump from the DVD layer to the next generation DVD layer based on the held reproducing position in accordance with the finish of reproduction of the DVD layer after the jump to the DVD layer.

Further, the optical disc device according to the first aspect further includes a flag holding means for holding a flag indicating that the jump from the next generation DVD layer to the DVD layer has been executed; where the jump controlling means is configured to determine whether the reproduction of the DVD layer is performed after the jump from the next generation DVD layer with reference to the flag, and executes the jump from the DVD layer to the next generation DVD layer in accordance with the finish of the reproduction of the DVD layer.

According to the first aspect, since the next generation DVD layer is reproduced in preference to the DVD layer, the possibility of the reproduction of the large capacity next generation DVD layer being missed does not occur. Further, the DVD layer is also effectively reproduced and used since a jump is appropriately performed from the next generation DVD layer to the DVD layer.

Control of linking the content recorded on the next generation DVD layer and the content recorded on the DVD layer is smoothly performed by performing the jump to the DVD layer based on the command information held in the next generation DVD layer. Further, the content of the next generation DVD layer and the content of the DVD layer are reproduced as one stream by returning to the HDDVD layer in accordance with the finish of the reproduction of the information (information for one title etc.) recorded on the DVD layer.

Moreover, as the jump from the HDDVD layer to the DVD layer is recognized by setting the flag, the reproduction of the DVD by the relevant jump and the reproduction of only the DVD layer from the start are distinguished. Thus, the necessity of returning to the HDDVD layer is easily determined, and the relevant returning control is smoothed.

A configuration of determining the hybrid next generation DVD based on the number of S curves on a focus error signal and the peak interval thereof is given in the following embodiment as a specific example of the determining means. Further, the processes in each means are mainly executed by a controller 106 in the embodiment described below.

A second aspect of the present invention relates to a hybrid optical disc, wherein a DVD layer and a next generation DVD layer are arranged in sequence from a laser light entering side; and command information for specifying a jump to the DVD layer and a destination of the jump is recorded on the next generation DVD.

In the second, aspect, the command information for setting a flag indicating that the next generation DVD is reproduced may be held in the next generation DVD layer.

BRIEF DESCRIPTION OF THE DRAWINGS

These and other objects, features and advantages according to the present invention may best be understood by reference to the following description of the presently preferred embodiment together with the accompanying drawings, in which:

FIG. 1 is shows a configuration of a hybrid next generation DVD according to an embodiment of the present invention;

FIGS. 2A and 2B are views explaining S curves of a focus error signal according to the embodiment of the present invention;

DETAILED DESCRIPTION OF THE PREFERRED EMBODIMENT

Figure 3:
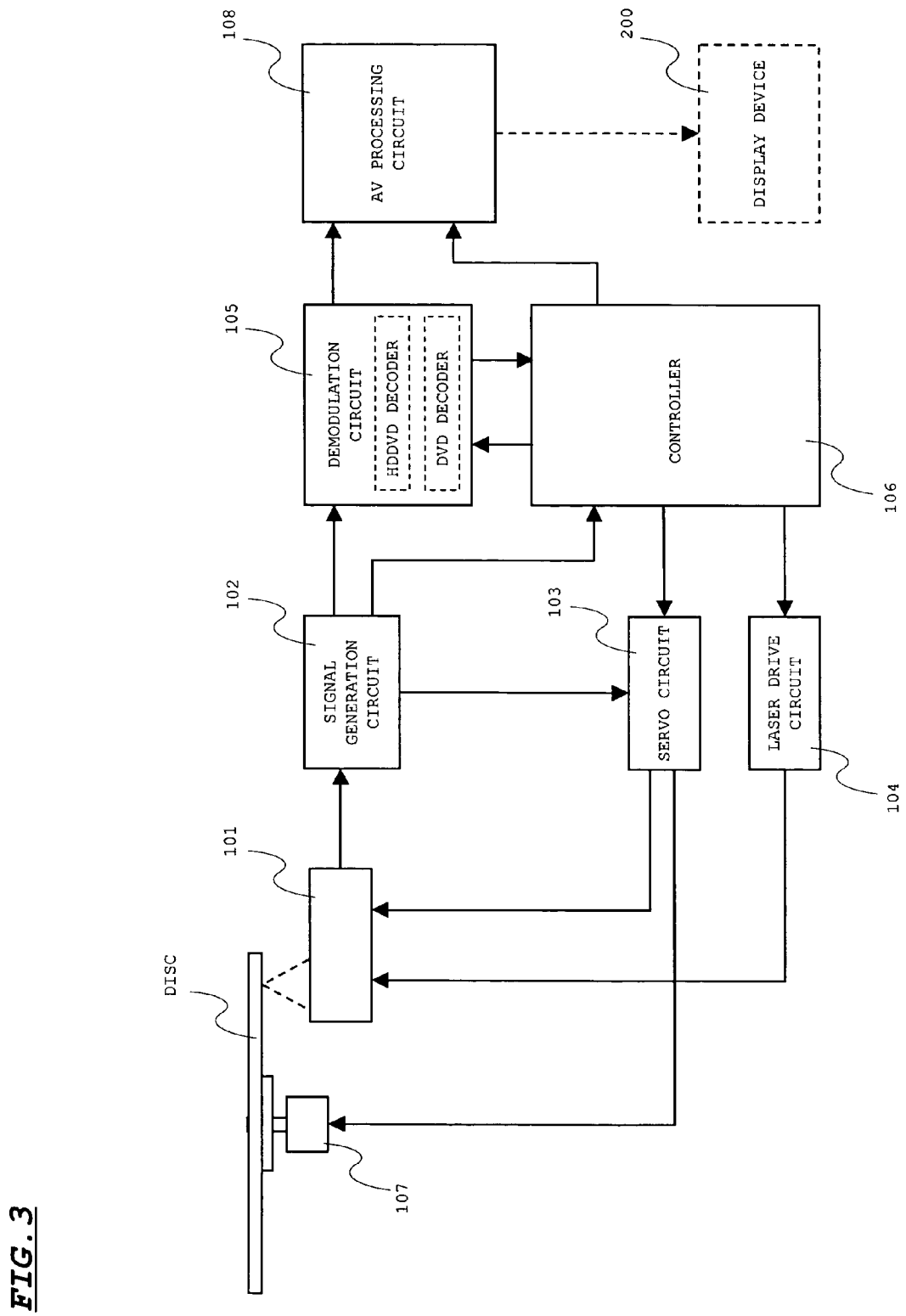
FIG. 3 shows a configuration of an optical disc device according to the embodiment of the present invention.

The embodiment of the present invention will now be described with reference to the drawings.

In the present embodiment, an optical disc device capable of compatibly reproducing both of a next generation DVD (single layer, HDDVD layer single sided multi-layer, HDDVD layer/DVD layer single sided hybrid) and a DVD (single layer, DVD layer single sided multi-layer) is illustrated.

FIG. 1 shows a configuration of the hybrid next generation DVD.

The hybrid next generation DVD 1 has a configuration in which a substrate 11 formed with a HDDVD layer 12 on one surface and a substrate 13 formed with a DVD layer 14 on one surface are laminated by an adhesive layer 15, and a printing layer 16 is formed on the other surface of the substrate 11. A laser light enters from the substrate 13 side. Helical tracks are formed on the HDDVD layer 12 and the DVD layer 14 in the recordable type. Pits are arrayed in helical shape in the reproduction only type.

The data format of the DVD layer 14 is the same as the data format of the existing DVD. Information indicating that the HDDVD layer 12 is present is not contained in lead-in information of the DVD layer 14. The DVD layer 14 transmits and reflects a blue laser light having a wavelength of about 405 nm and a red laser light having a wavelength of about 655 nm, respectively, at a defined ratio.

The data format complying with the next generation DVD standard is applied to the HDDVD layer 12. That is, in the hybrid next generation DVD, the lead-in information is present in both of the DVD layer 14 and the HDDVD layer 12. The information indicating that the DVD layer 14 is present is not either contained in the HDDVD layer 12 (this may be implemented in the future). However, in the HDDVD layer 12, as hereinafter described, a jump command and a variable setting command are held. The use of the jump command enables a jump to the DVD layer and a jump destination to be specified, and the use of the variable setting command enables "1" to be set to a variable i for indicating that the HDDVD layer has been reproduced.

The HDDVD layer 12 is formed by a material that reflects the blue laser light at a defined reflectance, but in which the reflectance for the red laser light is extremely low compared to that for the blue laser light. With such a setting of the reflectance, determination that the hybrid next generation DVD is loaded is performed.

The multi-layer type DVD in which two DVD layers are arranged on one surface has a configuration in which the HDDVD layer 12 is replaced by the DVD layer in the configuration of FIG. 1. In this case, the lead-in information is present in a DVD layer closer to the pick up out of the two DVD layers. In this lead-in information, information indicating the presence of two DVD layers is contained.

The multi-layer type next generation DVD in which two HDDVD layers are arranged on one surface has a configuration in which the HDDVD layer 12 is replaced by the DVD layer in the configuration of FIG. 1. In this case as well, the lead-in information is present only in a HDDVD layer closer to the pick up out of two HDDVD layers. In this lead-in information, information indicating the presence of two HDDVD layers is contained.

FIG. 2A is a schematic diagram showing S curves of the focus error signal of when the red laser light is irradiated on the DVD or the next generation DVD of multi-layer type having two DVD layers or two HDDVD layers on one surface and focus search is performed.

FIG. 2B is a schematic diagram showing the S curves of the focus error signal of when the red laser light is irradiated on the hybrid next generation DVD and focus search is performed.

When the red laser light is irradiated on the DVD or the next generation DVD of single layer type and focus search is performed, the S curve produced by the recording layer appears on the focus error signal. In this case, the S curve produced by the substrate surface also appears in addition to the S curve produced by the recording layer. However, since the peak interval of the S curve produced by the substrate surface is sufficiently small compared to the peak interval PP2 of FIG. 2B, false detection of recognizing the S curve produced by the substrate surface as the S curve produced by the recording layer can be avoided by appropriately setting a limiting value for detecting the S curve produced by the recording layer. As hereinafter described, determination of the disc type is made possible based on the differences in the S curves.

FIG. 3 shows a configuration of the optical disc device. In this figure, only the blocks associated with the reproduction system are shown.

The optical disc device includes an optical pick up 101, a signal generation circuit 102, a servo circuit 103, a laser drive circuit 104, a demodulation circuit 105, a controller 106, a spindle motor 107 and an AV processing circuit 108.

The optical pick up 101 includes a semiconductor laser for exiting the blue laser light having a wavelength of about 405 nm and a red laser light having a wavelength of about 655 nm, an objective lens for converging the laser light onto the disc, an objective lens actuator for driving the objective lens in a focusing direction and a tracking direction, a photodetector for receiving the reflected light from the disc, and an optical system for guiding each laser light exited from a semiconductor laser to the objective lens and for guiding the reflected light from the disc to the photodetector.

The signal generation circuit 102 performs calculation process on the signal from the photodetector arranged in the optical pick up 101, generates various signals such as RF signal, focus error signal, tracking error signal and the like and outputs the signals to their corresponding circuits.

The servo circuit 103 generates a focus servo signal and a tracking servo signal based on the signal input from the signal generation circuit 102, and outputs such signals to the objective lens actuator of the optical pick up 101. The servo circuit 103 also generates a motor servo signal based on the signal input from the signal generation circuit 102 and outputs the motor servo signal to the spindle motor 107.

The laser drive circuit 104 outputs a drive signal to the semiconductor laser in the optical pick up 101 based on a control signal input from the controller 106. The light emissions of the blue laser light and the red laser light are appropriately switched according to such control.

The demodulation circuit 105 demodulates the RF signal input from the signal generation circuit 102, generates the reproducing data and outputs the data to the AV processing circuit 108. The demodulation circuit 105 includes a demodulating section (HDDVD decoder) for performing data demodulation according to the next generation DVD data format and a demodulating section (DVD decoder) for performing data demodulation according to the DVD data format. Which demodulating section to use is set based on the control signal from the controller 106. Whether or not demodulatable at each demodulating section and the sub-information such as lead-in information are output from the demodulation circuit 105 to the controller 106.

The controller 106 stores various data in a built-in memory, and controls each section according to the program set in advance. The controller 106 receives the focus error signal from the signal generation circuit 102 in the disc determining process. The controller 106 then performs disc determination based on the relevant signal. Further the controller 106 controls jumps between the HDDV layer and the DVD layer based on command information (described laser) input from the demodulation circuit 106.

The AV processing circuit 108 processes the reproducing data input from the demodulation circuit 105, and acquires the video information and the sound information. The video information is output to a display device 200 such as television according to the control instruction from the controller 106. The sound information is output to a speaker or the like (not shown) according to the control instruction from the controller 106. Further, information for outputting a predetermined screen or sound is appropriately output from the AV processing circuit 108 according to the signal from the controller 106.

Figure 4:
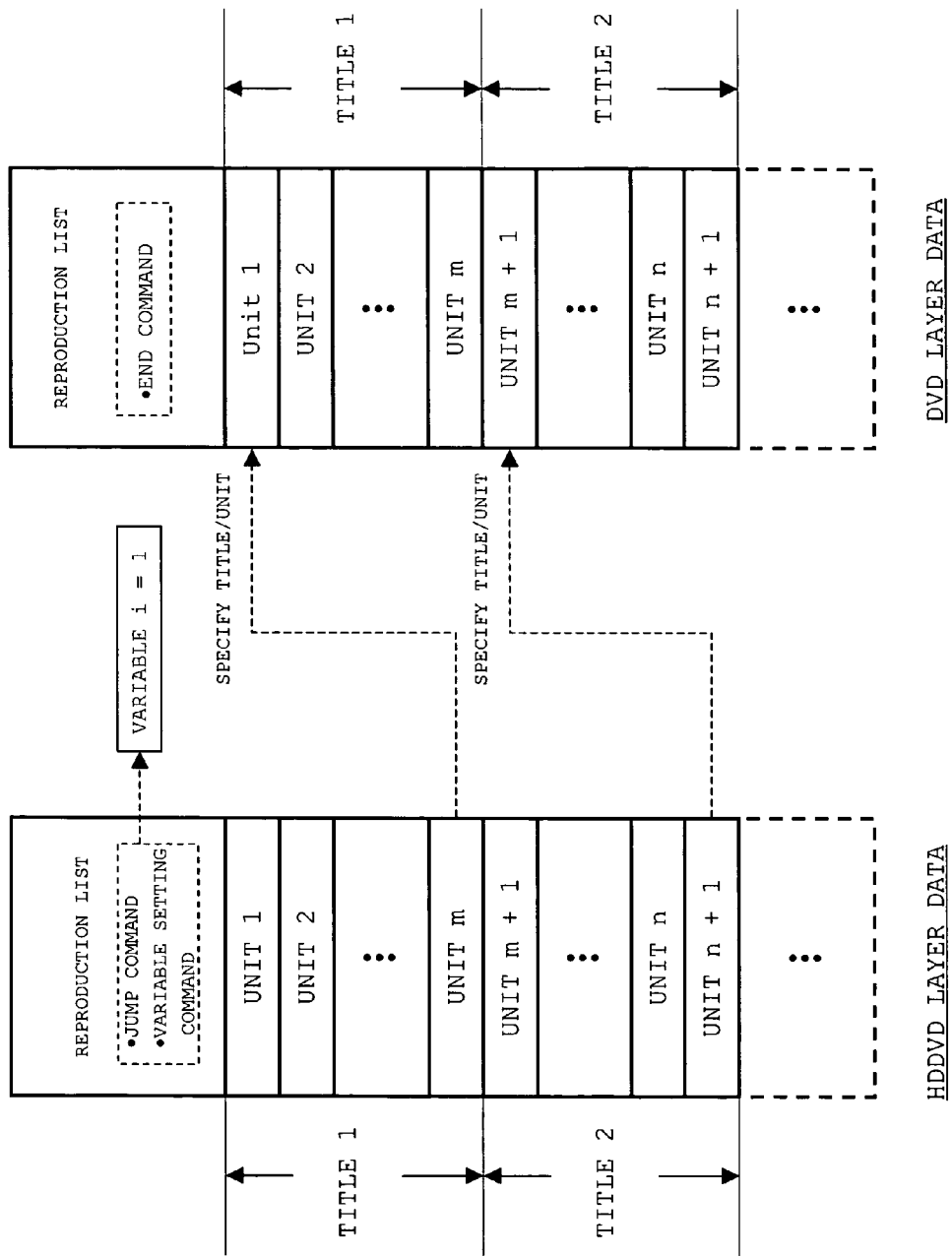
FIG. 4 shows data formats of content information according to the embodiment of the present invention.

FIG. 4 shows data formats of content information recorded on the HDDVD layer 12 and the DVD layer 14 of the hybrid next generation DVD 1.

As shown in the figure, the content information is divided into reproduction list and unit groups. Picture or sound data (MPEG data etc.) is stored in the unit groups (unit 1, unit 2, . . . ). Managing information such as link information for linking each unit and various command information are stored in the reproduction list.

The stream of picture or sound data is configured by linking each unit in order according to the link information in the reproduction list. The stream of picture or sound data is divided for each title if a plurality of titles (programs) are held in the recording layer. In order to link each title, a description for the linking is made in the reproduction list. In order to end the reproduction in one title, an end command is stored in the reproduction list.

In the present embodiment, the description for linking each title in order is contained in the reproduction list of the HDDVD layer 12. The end command for completing the reproduction process for every title is contained in the reproduction list of the DVD layer 14.

Further, in the present embodiment, a command (variable setting command) for setting "1" to the variable i out of the variables a to p commonly defined in the DVD layer 14 and the HDDVD layer 12 is included in the reproduction list of the HDDVD layer 12. Therefore, "1" is set to the variable i when the reproduction list of the HDDVD layer 12 is reproduced. Since the relevant command is not included in the reproduction list of the DVD layer 14, "1" is not set to the variable i even if the DVD layer 14 is reproduced after the reproduction of the HDDVD layer 12 is reset. "1" is set to the variable i when transition to the reproduction of the DVD layer 14 is carried out through the reproduction of the HDDVD layer 12.

Further, in the present embodiment, a command (jump command) for jumping from a predetermined unit on the HDDVD layer 12 to a unit on the DVD layer 14 and reproducing a predetermined title is contained in the reproduction list of the HDDVD layer 12. The relevant jump command may specify a target title on the DVD layer 14 or may specify a start address (unit number etc.) of the relevant title.

In the present embodiment, main content such as movie is recorded on the HDDVD layer 12 in a high-definition mode, and auxiliary content related to each scene of the main content is recorded on the DVD layer 14 in a normal mode. In this case, the jump command to jump from the unit corresponding to a certain scene of the main content to the title start position of the auxiliary content related to the relevant scene is contained in the reproduction list of the HDDVD layer 12. The jump from the HDDVD layer 12 to the DVD layer 14 is executed, and the title of the auxiliary content related to the certain scene of the main content is reproduced. When reproduction of the relevant title is finished, the reproducing position returns to the position on the HDDVD layer 12 following the position before the jump, and reproduction of the main content resumes.

Figure 5:
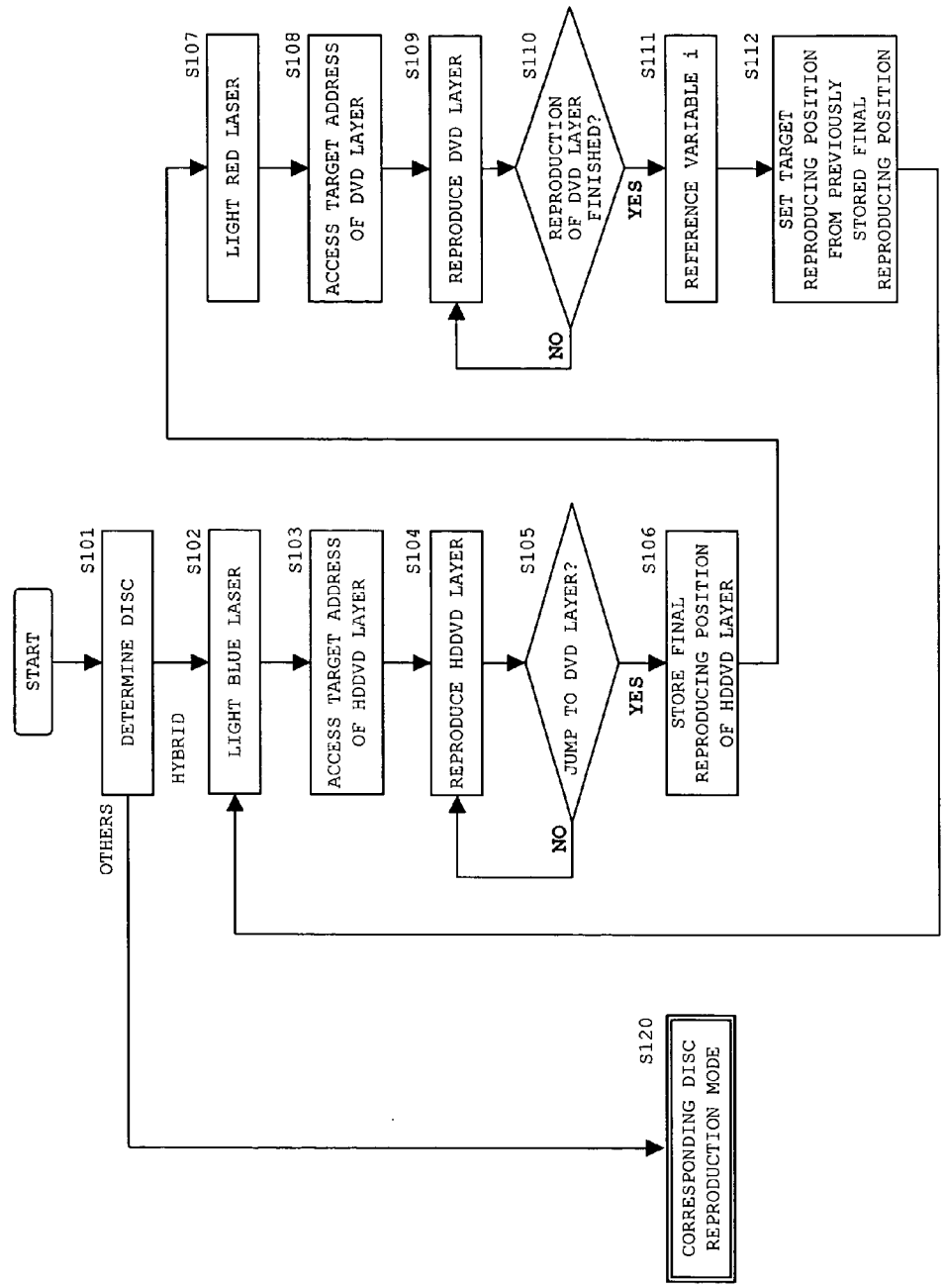
FIG. 5 is a process flowchart in disc reproduction according to the embodiment of the present invention.

FIG. 5 shows a process flowchart in disc reproduction.

When the disc is loaded on the optical disc device, the disc determining process is first performed (S101). Disc determination is performed using various methods. For instance, the information of each recording layer may actually be demodulated while switching the laser light and the demodulating section, and disc determination may be performed based on whether or not demodulatable.

In the present embodiment, disc determination is performed based on the S curve produced on the focus error signal shown in FIG. 2. That is, after the red laser light is lighted, focus search on the relevant disc is performed. Determination is made on whether the disc is a single layer type or a multi-layer type based on the number of S curves produced on the focus error signal. In a case of multi-layer type, the ratio (R=PP1/PP2) between the peak interval PP1 of the largest S curve and the peak interval PP2 of the second largest S curve is calculated. If the peak ratio R is greater than or equal to a threshold value, the disc is determined as the multi-layer disc in which a plurality of DVD layers or HDDVD layers are arranged. If the peak ratio R is less than the threshold value and the peak interval PP2 of the S curve is greater than or equal to a detection limit of the S curve, the disc is determined as the hybrid next generation DVD in which the DVD layer and the HDDVD layer are arranged.

When the disc is determined as the multi-layer disc in which a plurality of DVD layers or HDDVD layers are arranged, the recording layer positioned first when seen from the optical pick up side is read with the red laser light. The read signal is demodulated with the DVD decoding section of the demodulation circuit 105, and determination is made on whether or not demodulatable. If demodulatable, the disc is determined as the multi-layer disc in which a plurality of DVD layers are arranged. If not demodulatable, the disc is determined as the multi-layer disc in which a plurality of HDDVD layers are arranged. In this case, determination is made on whether or not the first recording layer is demodulatable with the blue laser light to verify that the disc is the multi layer disc in which a plurality of HDDVD layers are arranged.

When the disc is determined as the single layer type from the number of S curves produced on the focus error signal, the relevant recording layer is read with the red laser light. The read signal is demodulated with the DVD decoding section of the demodulation circuit 105, and determination is made on whether or not demodulatable. If demodulatable, the disc is determined as the single layer disc in which one DVD layer is arranged. If not demodulatable, the disc is determined as the single layer disc in which one HDDVD layer is arranged. In this case, determination is made on whether or not the recording layer is demodulatable with the blue laser light to verify that the disc is the single layer disc in which one HDDVD layer is arranged.

If the determination result in S101 is not the hybrid next generation DVD, reproduction is performed in a disc mode corresponding to the determination result (S120).

If the determination result in S101 is the hybrid next generation DVD, the lighted laser is switched to the blue laser (S102), and reproduction on the HDDVD layer 12 positioned at the back when seen from the optical pick up side is performed (S103, S104). The lead-in information of the HDDVD layer 12 and the above described reproduction list are read in reproduction. The data of each unit is sequentially reproduced according to the reproduction list.

When the reproduction list is read in this manner, the variable setting command stored in the reproduction list is executed. "1" is then set to the variable i. The initial value (e.g., "0") of the variable i is set in loading the disc, in starting the reproduction of the disc and the like.

Subsequently, the HDDVD layer 12 is reproduced until the unit to be reproduced reaches the unit specified by the jump command in the reproduction list (S105). When the reproducing position reaches the unit specified by the jump command (S105: YES), the relevant reproducing position (unit number) is stored (S106), and the lighted laser is switched to the red laser (S107). Thereafter, the jump command is executed to jump to the DVD layer 14 (S108).

In execution of the jump command, the lead-in information and the reproduction list of the DVD layer 14 are first read. The read reproduction list contains the above-mentioned end command.

Subsequent to reading the reproduction list, the starting unit of the title specified by the jump command is accessed and the relevant title is reproduced (S109). This reproduction is performed up to the final unit of the relevant title unless an interrupt instruction is input by the user (S110). When the reproduction of the final unit of the relevant title is finished, the end command is executed and reproduction of the DVD layer 14 is terminated. The reproduction of the DVD layer 14 is also terminated even if the interrupt instruction is input by the user in the middle.

When the reproduction of the DVD layer 14 is finished, the variable i is then referenced. The variable i is used in determining whether to jump to the HDDVD layer 12. That is, if the variable i is set to "1", determination to jump to the HDDVD layer 12 is made. If the variable i is not set to "1", the jump to the HDDVD layer 12 is not performed and the reproduction process is assumed to be finished.

In the present process flow, determination is made to jump to the HDDVD layer 12 since the variable i is set to "1" in S104. When the reproduction of the DVD layer 14 is not by the jump from the HDDVD layer 12, the variable i is not set to "1". In this case, the reproduction process is terminated in accordance with the finish of reproduction of the relevant title.

When it is determined to jump to the HDDVD layer 12, the final reproducing position (unit number) of the HDDVD layer stored in S106 is referenced, and the reproducing position (unit number) following such position is set as the target position after the jump (S112). After the lighted laser is switched to the blue laser (S102), the jump to the HDDVD layer 12 is executed, and the target position set in S112 is accessed (S103).

The reproduction of the main content (HDDVD layer) again starts from the position following the position at the time of the jump to the DVD layer 14. This reproduction continues until the reproducing position reaches the unit specified by the next jump command (S105). When the reproducing position reaches the unit specified by the jump command (S105: YES), the reproducing position (unit number) is stored (S106), and the lighted laser is switched to the red laser (S107), and the jump command is executed, similar to the above. The jump to the DVD layer 14 is then performed, and the title specified by the jump command is reproduced (S108, S109). Subsequently, similar processes are repeated until the reproduction of the HDDVD layer 12 is finished.

In the above example, determination is made on whether or not the loaded disc is the hybrid next generation DVD using the red laser light, but such determination may be made using the blue laser light. In such a case, the lighted laser does not need to be switched, and the process of S102 may be omitted when the transition from the disc determination to the process on the relevant disc is carried out.

When determination is made on whether or not the disc is the hybrid next generation DVD using the blue laser light, the following process flow, for example, is applied.

First, focus search is performed with the blue laser light, and the number of recording layers is determined from the obtained number of S curves. If a plurality of recording layers are present, the recording layer positioned first and the recording layer positioned next when seen from the optical pick up side are read with the blue laser light. The read signals are demodulated with the HDDVD decoding section of the demodulation circuit 105, and determination is made on whether or not demodulatable. If neither recording layer is demodulated, the disc is determined as the multi-layer type DVD in which two DVD layers are arranged. If both recording layers are demodulated, the disc is determined as the multi-layer type next generation DVD in which two HDDVD layers are arranged. If the first recording layer is not demodulated, and the next recording layer is demodulated, the disc is determined as the hybrid next generation DVD in which a plurality of HDDVD layers and DVD layers are arranged.

Figure 6:
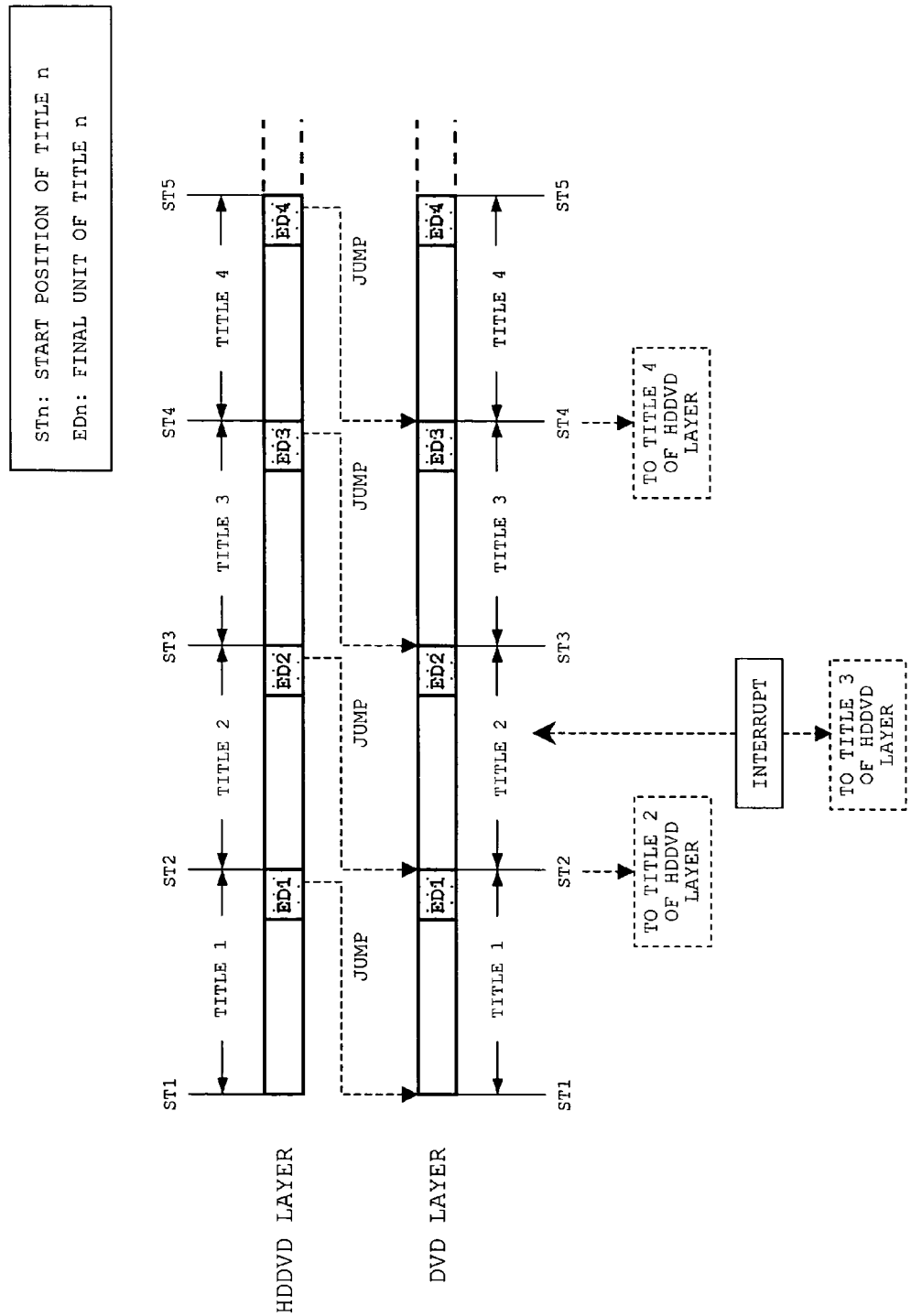
FIG. 6 is a view schematically illustrating a disc reproduction operation according to the embodiment of the present invention.

FIG. 6 is a schematic diagram showing the reproducing operation of when the jump command is set for every end of the title.

In this case, reproduction starts from title 1 of the HDDVD layer. When such reproduction is finished, the jump command is executed, and title 1 of the DVD layer is reproduced. Thereafter, the variable i is referenced to jump to the start position of title 2 of the HDDVD layer when the reproduction of title 1 of the DVD layer is finished. Title 2 of the HDDVD layer is then reproduced. If the interrupt instruction is input from the user in the middle of reproducing the title of the DVD layer, the jump to the HDDVD layer is performed, and the next title of the HDDVD layer is reproduced. The jump between the HDDVD layer and the DVD layer is then similarly repeated, and the title of each layer is sequentially reproduced.

According to the present embodiment, the HDDVD layer 12 is reliably reproduced since the HDDVD layer 12 is reproduced in preference to the DVD layer 14. The reproduction that effectively uses the DVD layer 14 is realized by appropriately including the jump command in the reproduction list of the HDDVD layer 12. Since the reproducing position returns to the position following the position before the jump of the next generation DVD layer 12 in accordance with the reproduction of one title of the DVD layer 14, the DVD layer 14 is not continuously reproduced even if the jump to the DVD layer 14 is performed. According to the present embodiment, the stream reproduction linking each content of the HDDVD layer 12 and the DVD layer 14 is realized.

The present invention is not limited to the above embodiment, and various other changes may be made.

For instance, although the jump from the HDDVD layer to the DVD layer is executed at the timing when the reproducing position reaches the unit position specified by the jump command in the above embodiment, the jump from the HDDVD layer to the DVD layer may be executed in accordance with the input of the jump instruction from the user before reaching the relevant unit position. In this case, for instance, the jump command associated with the title being reproduced is executed at the time of input of the jump instruction. If a plurality of jump commands are associated with the title being reproduced, the jump is executed at the unit position closest to the reproducing position out of the unit positions specified by the jump command. Further, the reproducing unit at the time of input of the jump instruction is stored, and the returning position on the HDDVD layer is the unit position following the relevant reproducing unit. By doing so, the auxiliary content with respect to each title of the main content is arbitrarily read and reproduced.

The jump from the HDDVD layer to the DVD layer may be performed not according to the jump command but according to the jump instruction arbitrarily input from the user. In this case, a means for specifying the jump destination on the DVD layer is separately required. This means may use a method of presenting the title menu of the DVD layer to the user according to the jump instruction. That is, the jump to the DVD layer may be executed with the start position (start unit) of the title selected on the presented title menu by the user as the destination to jump to.

In addition, although the return to the HDDVD layer is performed based on the finish of reproduction of the DVD layer and the setting state of the variable i, a method of describing a conditional program on the HDDVD layer to return to the HDDVD layer, a method of returning to the HDDVD layer after a set time has elapsed from the reproduction of the DVD layer and other may be used.

Although the information indicating the presence of the HDDVD layer is not held in the DVD layer in the above embodiment, the present invention exhibits a constant effect even if the information indicating the presence of the HDDVD layer is held in the DVD layer. For instance, when the information indicating the presence of the HDDVD layer is held in the lead-in information of the DVD layer but the information for jumping to the HDDVD layer is not contained in the data region, if reproduction starts on the DVD layer in preference to the HDDVD layer, transition to the reproduction of the HDDVD layer is not made in the subsequent reproducing operation unless a special process is performed. In this case, the reproduction of the HDDVD layer may be missed. According to the present invention, on the other hand, since the reproduction starts on the HDDVD layer in preference to the DVD layer, and the jump to the DVD layer is appropriately performed in the subsequent reproducing operation, neither reproduction is missed, and both the HDDVD layer and the DVD layer can be smoothly reproduced.

The present invention has been explained regarding the hybrid optical disc including the DVD layer and the HDDVD layer, but the present invention is also applicable to a disc such as a Blu-ray disc in which the cover layer having a thickness of 0.1 mm is arranged on the entering side of the laser light, and the recording layer complying with the Blu-ray format is arranged behind the cover layer. In this case, for the hybrid optical disc, the DVD layer is arranged in at a position 0.6 mm from the disc surface of the entering side of the laser light.

Various modifications may be appropriately made on the embodiment of the present invention without departing from the scope of the technical ideas described in the appended claims.

What is claimed is:

1. An optical disc device capable of reproducing a hybrid optical disc in which a DVD layer and a next generation DVD layer are arranged, the next generation DVD layer being reproduced with a laser light having a wavelength shorter than a wavelength of a laser light used for the DVD layer and command information for jumping to the DVD layer is recorded on the next generation DVD layer, the optical disc device comprising:
a disc determining means for determining that the hybrid optical disc is loaded;
a reproducing means for first executing a reproduction process on the next generation DVD layer in preference to the DVD layer when it is determined that the hybrid optical disc is loaded;
a jump determining means for determining necessity of a jump to the DVD layer; and
a jump controlling means for executing the jump from the next generation DVD layer to the DVD layer according to a determination result by the jump determining means, wherein
the jump determining means determines the necessity of the jump to the DVD layer based on the command information acquired by reproducing the next generation DVD layer.

2. The optical disc device according to claim 1, wherein the jump controlling means determines a jumping position with respect to the DVD layer based on the command information acquired by reproducing the next generation DVD layer.

3. The optical disc device according to claim 1, wherein the jump controlling means holds a reproducing position of the next generation DVD layer immediately before the jump to the DVD layer, and executes the jump from the DVD layer to the next generation DVD layer based on the held reproducing position in accordance with finish of reproduction of the DVD layer after the jump to the DVD layer.

4. The optical disc device according to claim 3, further comprising:
a flag holding means for holding a flag indicating that the jump from the next generation DVD layer to the DVD layer has been executed, wherein
the jump controlling means determines whether the reproduction of the DVD layer is performed after the jump from the next generation DVD layer with reference to the flag, and executes the jump from the DVD layer to the next generation DVD layer in accordance with the finish of the reproduction of the DVD layer.

5. An optical disc device capable of reproducing a hybrid optical disc in which a DVD layer and a next generation DVD layer are arranged, the next generation DVD layer being reproduced with a laser light having a wavelength shorter than a wavelength of a laser light used for the DVD layer and command information for jumping to the DVD layer is recorded on the next generation DVD layer, the optical disc device comprising:
 a disc determination processing section for determining that the hybrid optical disc is loaded;
 a reproduction processing section for first executing a reproduction process on the next generation DVD layer in preference to the DVD layer when it is determined that the hybrid optical disc is loaded;
 a jump determination processing section for determining necessity of a jump to the DVD layer; and
 a jump control processing section for executing the jump from the next generation DVD layer to the DVD layer according to a determination result by the jump determination processing section, wherein
 the jump determining means determines the necessity of the jump to the DVD layer based on the command information acquired by reproducing the next generation DVD layer.

6. The optical disc device according to claim 5, wherein the jump control processing section determines a jumping position with respect to the DVD layer based on the command information acquired by reproducing the next generation DVD layer.

7. The optical disc device according to claim 5, wherein the jump control processing section holds a reproducing position of the next generation DVD layer immediately before the jump to the DVD layer, and executes the jump from the DVD layer to the next generation DVD layer based on the held reproducing position in accordance with the finish of reproduction of the DVD layer after the jump to the DVD layer.

8. The optical disc device according to claim 7, further comprising:
 a flag holding section for holding a flag indicating that a jump from the next generation DVD layer to the DVD layer has been executed, wherein
 the jump control processing section determines whether the reproduction of the DVD layer is performed after the jump from the next generation DVD layer with reference to the flag, and executes the jump from the DVD layer to the next generation DVD layer in accordance with the finish of the reproduction of the DVD layer.

9. A hybrid optical disc, comprising:
 a DVD layer and a next generation DVD layer wherein
 the next generation DVD layer is reproduced with a laser light having a wavelength shorter than a wavelength of a laser light used for the DVD layer, and
 command information for specifying the jump to the DVD layer and a destination of the jump is recorded on the next generation DVD layer, wherein
 the next generation DVD layer is subject to reproduction first in preference to the DVD layer.

10. The hybrid optical disc according to claim 9, wherein the command information for setting a flag indicating that the next generation DVD is reproduced is held in the next generation DVD layer.

* * * * *